(12) United States Patent
Kato

(10) Patent No.: US 11,422,359 B2
(45) Date of Patent: Aug. 23, 2022

(54) PROJECTOR, ROTATIONAL PHASE CONTROL DEVICE, PROGRAM FOR THE ROTATIONAL PHASE CONTROL DEVICE AND WHEEL ROTATIONAL SPEED CONTROL METHOD

(71) Applicant: NEC Display Solutions, Ltd., Tokyo (JP)

(72) Inventor: Takeshi Kato, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/768,767

(22) PCT Filed: Dec. 5, 2017

(86) PCT No.: PCT/JP2017/043667
§ 371 (c)(1),
(2) Date: Jun. 1, 2020

(87) PCT Pub. No.: WO2019/111326
PCT Pub. Date: Jun. 13, 2019

(65) Prior Publication Data
US 2020/0319540 A1 Oct. 8, 2020

(51) Int. Cl.
*G02B 26/00* (2006.01)
*G02B 27/00* (2006.01)
(Continued)

(52) U.S. Cl.
CPC ....... *G02B 26/008* (2013.01); *G02B 27/0068* (2013.01); *G03B 21/00* (2013.01);
(Continued)

(58) Field of Classification Search
CPC ...... G03B 21/204; G03B 33/08; G03B 21/00; G03B 21/14; G02B 26/008; G02B 27/0068
See application file for complete search history.

(56) References Cited

U.S. PATENT DOCUMENTS

2011/0043765 A1* 2/2011 Shibasaki .............. G03B 21/28
353/121
2014/0176914 A1* 6/2014 Mueller ................. G03B 33/08
353/31
(Continued)

FOREIGN PATENT DOCUMENTS

JP 2008286872 A * 11/2008 ............. G03B 21/00
JP 2011-215332 A 10/2011
(Continued)

OTHER PUBLICATIONS

International Search Report (ISR) (PCT Form PCT/ISA/210), in PCT/JP2017/043667, dated Feb. 27, 2018.

*Primary Examiner* — Magda Cruz
(74) *Attorney, Agent, or Firm* — McGinn I.P. Law Group, PLLC.

(57) ABSTRACT

A projector, a rotational phase control device, a program for the rotational phase control device, and a wheel rotational speed control method include: a phosphor wheel that emits a plurality of different color lights at a cycle corresponding to a rotational speed when excitation light is irradiated; a color wheel into which the lights emitted from phosphor wheel enter; and a rotational phase control device that controls a rotational speed and a phase of color wheel in accordance with a rotational speed and a phase of phosphor wheel so that a phase relationship between phosphor wheel and color wheel is not changed and so that a rotational speed ratio between phosphor wheel and color wheel is equal to a rotational speed ratio between phosphor wheel and color wheel in a steady state.

16 Claims, 9 Drawing Sheets

(51) Int. Cl.
  *G03B 33/08*   (2006.01)
  *G03B 21/00*   (2006.01)
  *G03B 21/14*   (2006.01)
  *G03B 21/20*   (2006.01)

(52) U.S. Cl.
  CPC .......... *G03B 21/14* (2013.01); *G03B 21/204* (2013.01); *G03B 33/08* (2013.01)

(56) References Cited

U.S. PATENT DOCUMENTS

| | | | | |
|---|---|---|---|---|
| 2015/0109584 A1* | 4/2015 | Murai | ................ | H04N 9/3161 353/31 |
| 2018/0039168 A1* | 2/2018 | Suzuki | ................ | G03B 21/147 |
| 2018/0051865 A1* | 2/2018 | Cui | ................ | G03B 33/08 |
| 2018/0149957 A1* | 5/2018 | Maeda | ................ | H04N 9/3155 |
| 2018/0249137 A1* | 8/2018 | Kobayashi | ............ | H04N 9/312 |
| 2018/0259158 A1* | 9/2018 | Cui | ................ | G03B 33/08 |
| 2019/0199981 A1* | 6/2019 | Murakami | ............ | G03B 21/008 |
| 2020/0233288 A1* | 7/2020 | Hamamura | ............ | G03B 21/204 |

FOREIGN PATENT DOCUMENTS

| | | |
|---|---|---|
| JP | 2014-032266 A | 2/2014 |
| JP | 2014-123563 A | 7/2014 |
| JP | 2014-132259 A | 7/2014 |
| JP | 2014-186081 A | 10/2014 |
| JP | 2015-004798 A | 1/2015 |
| JP | 2015-036776 A | 2/2015 |
| JP | 2016-090850 A | 5/2016 |
| JP | 2016-105122 A | 6/2016 |

* cited by examiner

[Fig. 1]
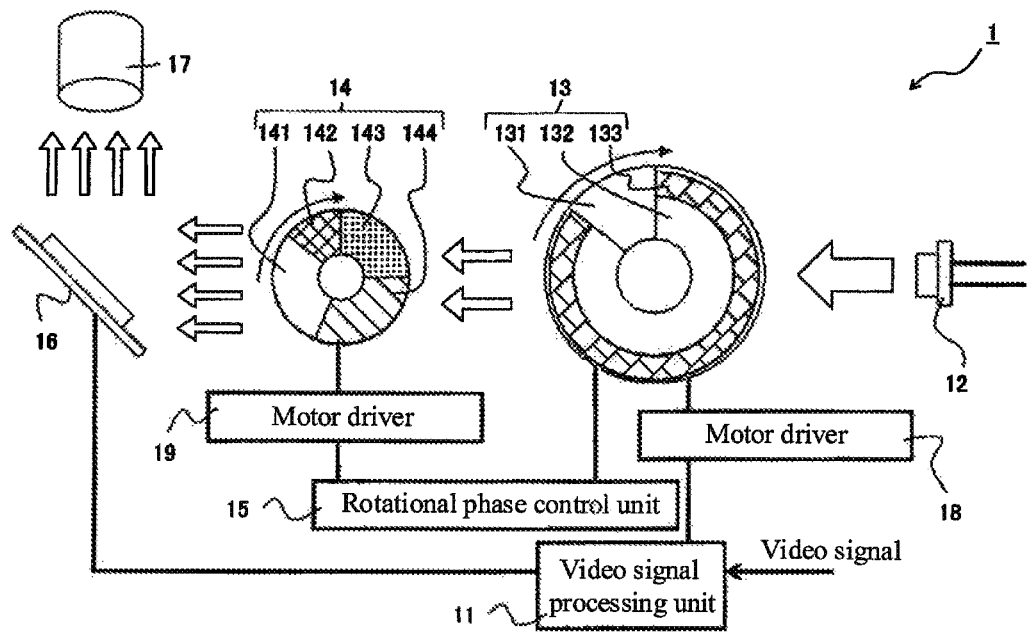
[Fig. 2]
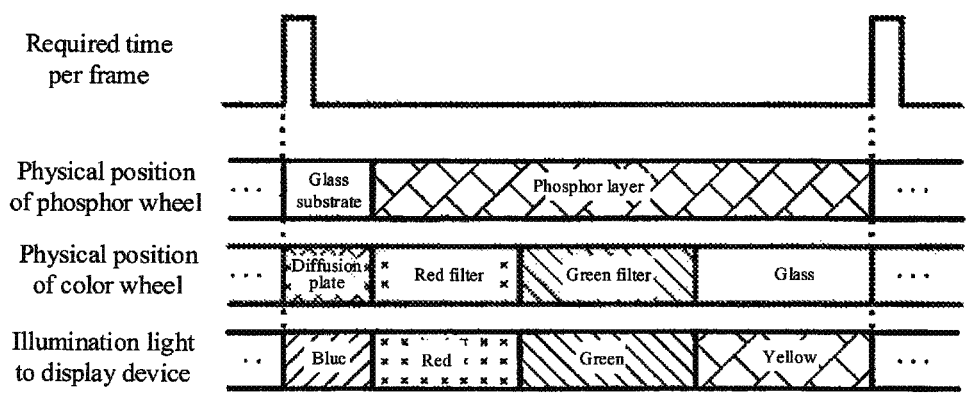

[Fig. 3]
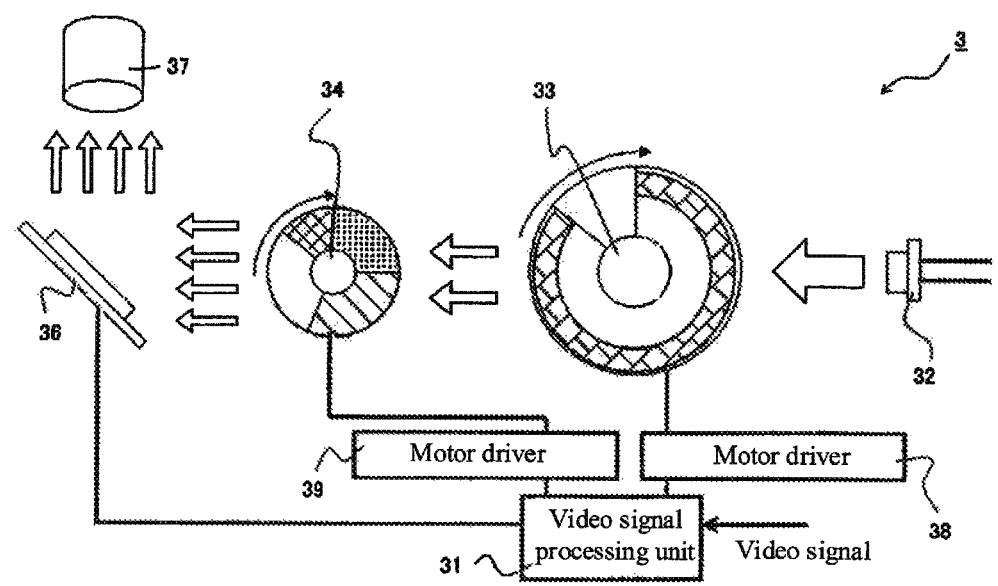

[Fig. 4]
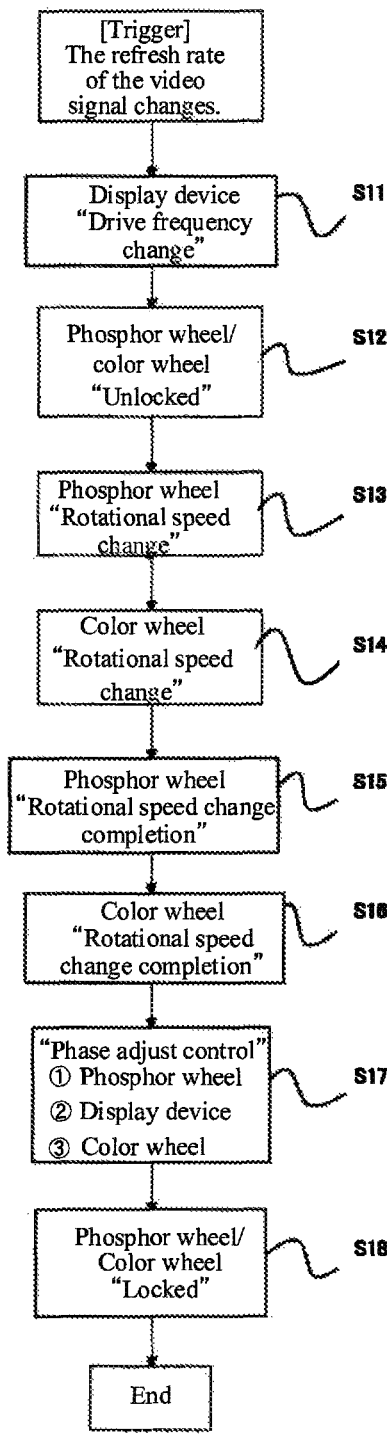

[Fig. 5]
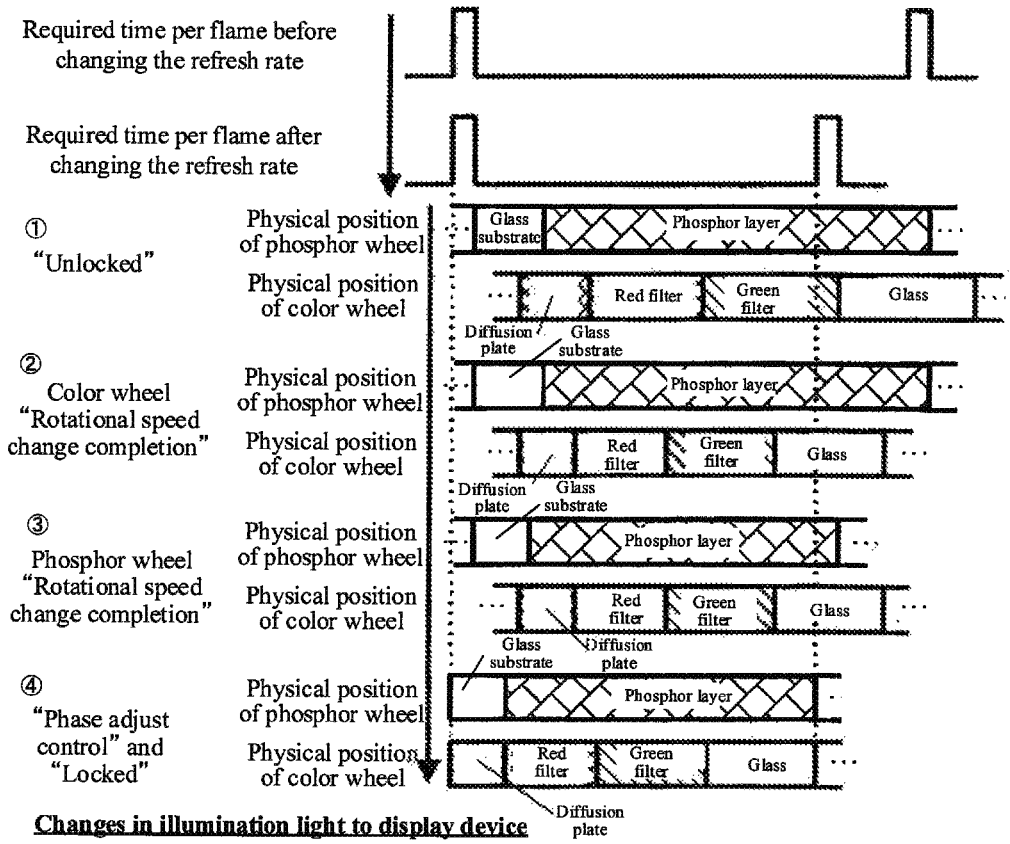

[Fig. 6]
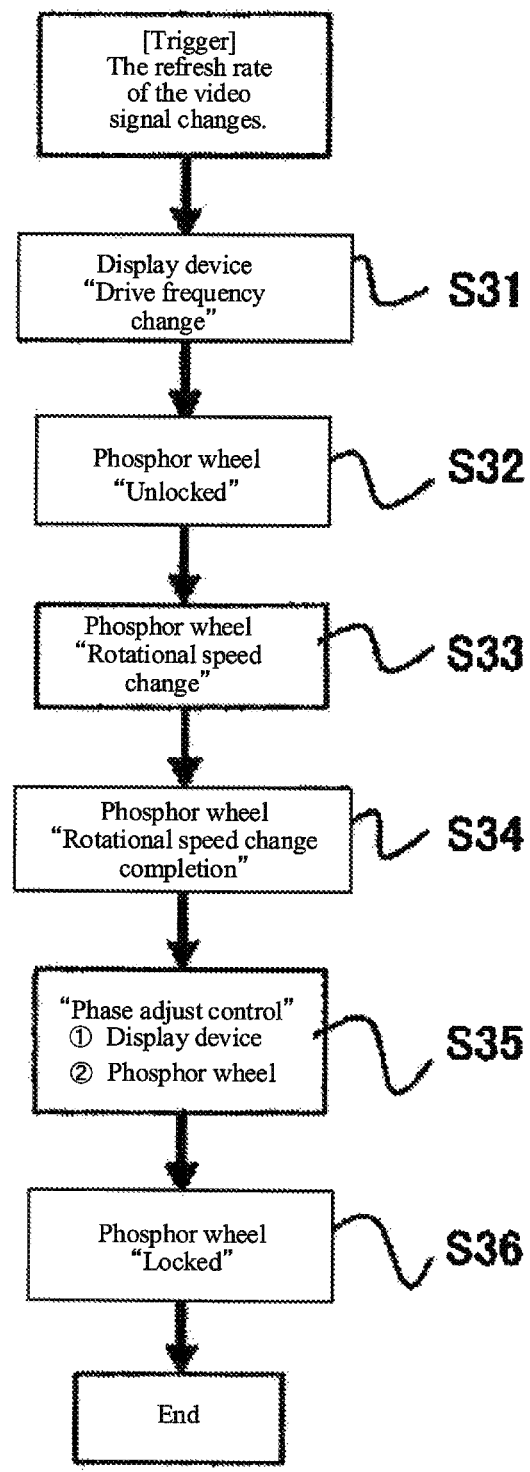

[Fig. 7]
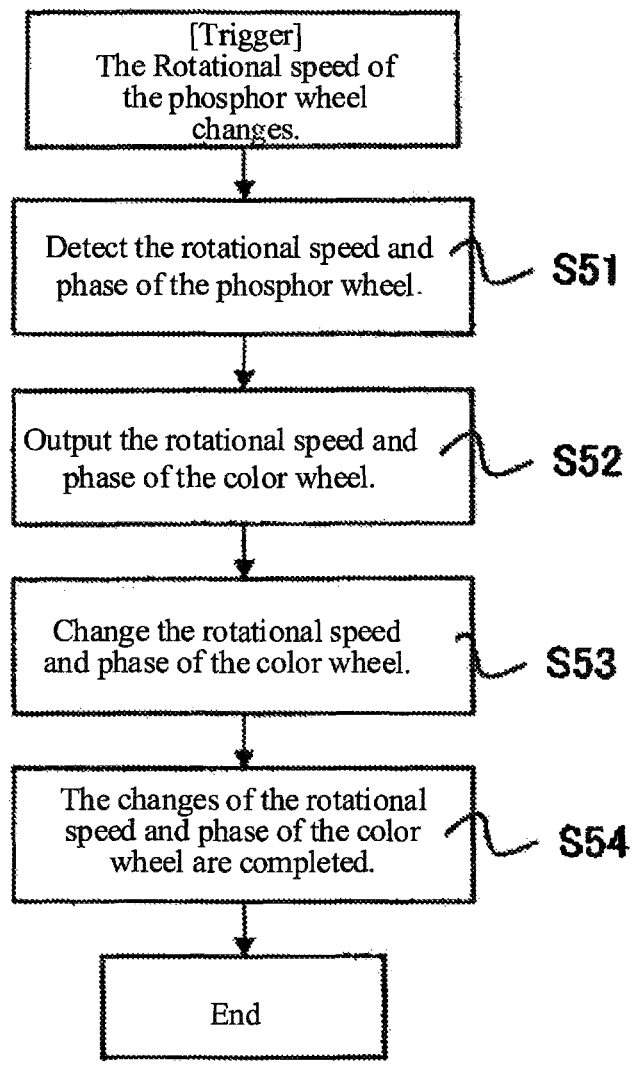

[Fig. 8]
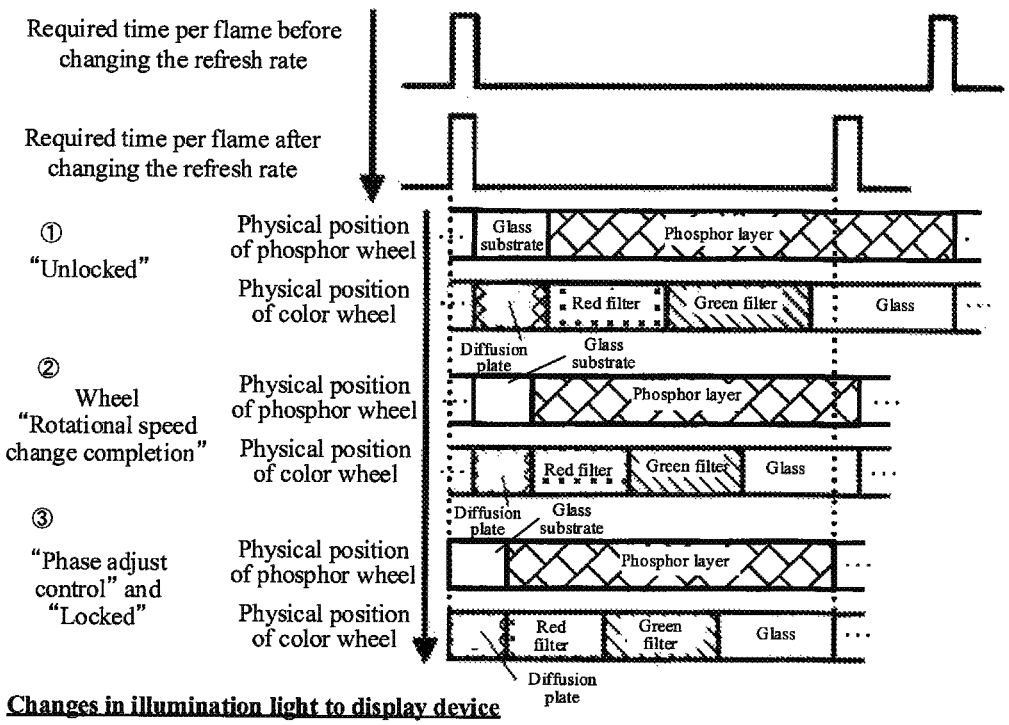
Changes in illumination light to display device
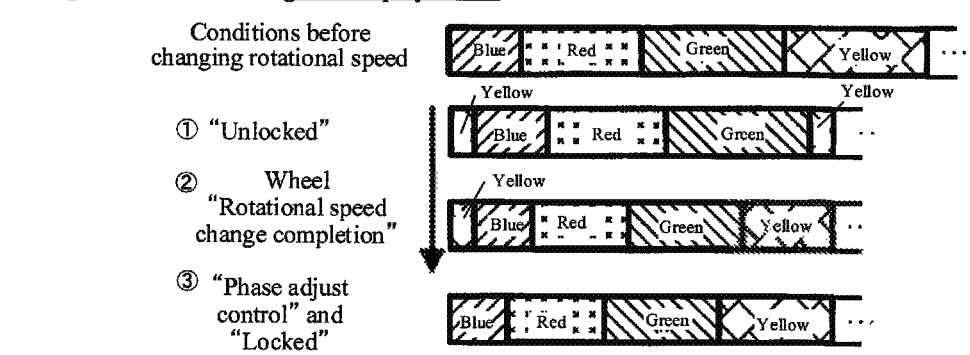

[Fig. 9]
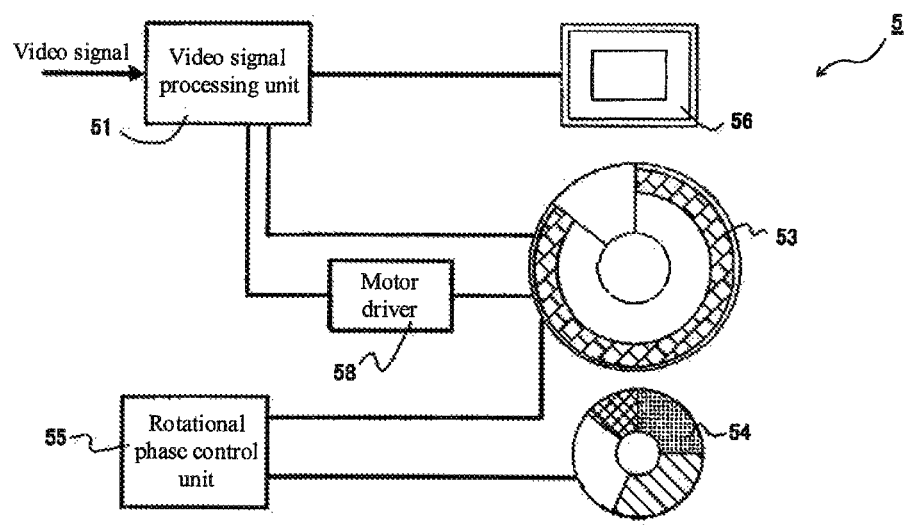
[Fig. 10]
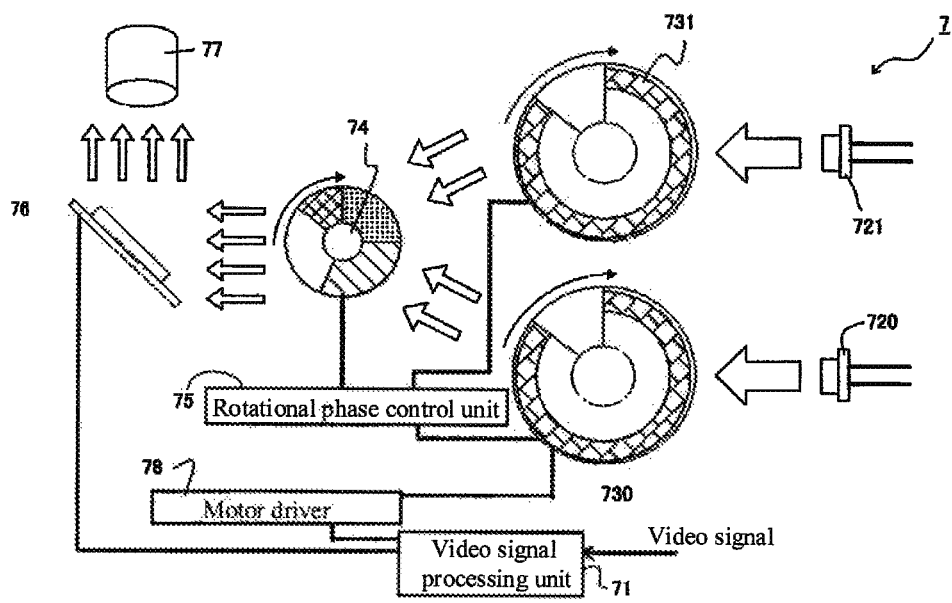

[Fig. 11]
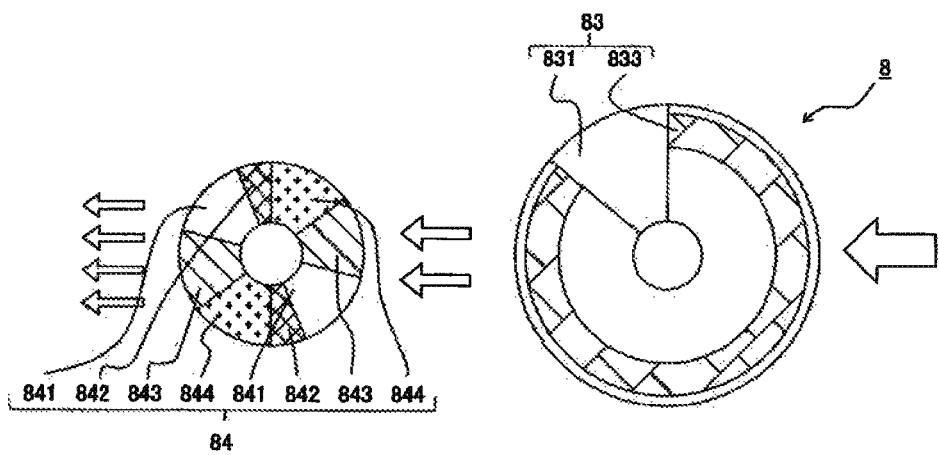
[Fig. 12]
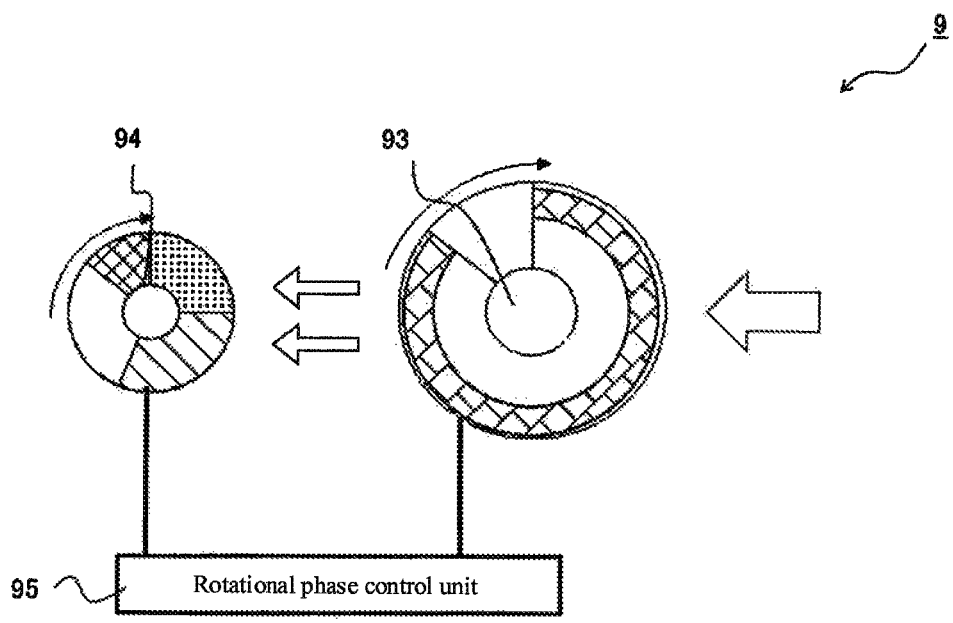

PROJECTOR, ROTATIONAL PHASE CONTROL DEVICE, PROGRAM FOR THE ROTATIONAL PHASE CONTROL DEVICE AND WHEEL ROTATIONAL SPEED CONTROL METHOD

TECHNICAL FIELD

The present invention relates to a projector, a rotational phase control device, a program for the rotational phase control device, and a wheel rotational speed control method.

BACKGROUND ART

Recently, light sources of projectors have changed from lamps to solid-state light sources such as LDs (Laser Diode), LEDs (Light Emitting Diode), etc. In particular, in a high-brightness projector, an image for projection is generated by using laser light emitted from a solid-state light source and fluorescent light emitted from a phosphor.

For example, patent document 1 discloses an example of a projector in which a solid-state light source and a phosphor are used. The projector described in patent document 1 includes a light source unit, a phosphor wheel, a filter wheel (color wheel), and a DMD (Digital Micromirror Device). It this projector, the DMD is irradiated with red, green, and yellow lights having high purity in a time division manner to generate red, green, and yellow monochromatic image lights. The projector projects these image lights on the same surface in order to project a color image. The pure red, green, and yellow high purity lights that are used in the projector are generated by using excitation light emitted by the light source section, the phosphor wheel, and the filter wheel.

Specifically, the phosphor wheel includes an annular metal plate. The annular metal plate has annular region in which a phosphor that emits green light using excitation light is coated in the circumferential direction, an annular region in which a phosphor that emits red light using excitation light is coated, and a notched region. In the projector, the annular metal plate is rotationally driven when the excitation light is irradiated. As a result, the irradiation position of the excitation light sequentially moves each region on the phosphor. Therefore, green light emitted by the phosphor, red light emitted by the phosphor, and blue excitation light that passed through the notched region are sequentially emitted from the phosphor wheel.

The filter wheel includes a glass substrate which is divided in the circumferential direction, a green color filter, and a red color filter. Green fluorescent light from the phosphor wheel is incident on the green color filter. Red fluorescent light from the phosphor wheel is incident on the red color fitter. As a result, extra wavelength components outside a specific wavelength range are removed from the green and red fluorescent lights, resulting in high-purity light. Blue excitation light is incident the glass substrate of the filter wheel. In this case, it is necessary that light from the phosphor wheel be incident on a corresponding region of the color wheel. Therefore, the projector controls the rotational speed of the phosphor wheel and the rotational speed of the filter wheel so that the phosphor wheel and the filter wheel are synchronized with each other by using the formatter.

As a result, in the projector described in Patent Document 1, light of three primary colors of red, blue, and green having high purity can be generated. These lights are used to generate image light for projection.

Another example of a projector using a phosphor is described in Patent Document 2. The projector described in Patent Document 2 includes an excitation light source, a phosphor wheel, a wheel motor, and motor control means. In the phosphor wheel, an annular green phosphor layer is laid on a disk-shaped substrate in the circumferential direction. The light source unit described in Patent Document 2 irradiates the phosphor layer of the phosphor wheel with excitation light from the excitation light source. As a result, the projector generates green light. When the green light is generated, the wheel motor rotates the phosphor wheel to move the surface of the phosphor wheel on which the excitation light is incident. As a result, the phosphor wheel radiates heat. The motor control means adjusts the amount of heat radiation from the phosphor wheel by changing the rotational speed of the phosphor wheel.

LITERATURE OF THE PRIOR ART

Patent Literature

Patent Document 1: Japanese Patent Application Laid-Open No. 2014-132259
Patent Document 2: Japanese Patent Application Laid-Open No. 2011-2135332

DISCLOSURE OF THE INVENTION

Problems to be Solved by the Invention

As in the projector described in Patent Document 2, the rotational speed of the phosphor wheel may be changed. In the projector described in Patent Document 1, if only the rotational speed of the phosphor wheel is changed, the relationship between the phase of the phosphor wheel and the phase of the filter wheel will deviate. Therefore, the projector cannot irradiate the DMD with red, green, and yellow high purity lights in a time division manner. Therefore, in the projector, it is necessary to change the rotational speed of the filter wheel as well. However, there is a difference in the response speed between the phosphor wheel and the filter wheel when the rotational speeds of the wheels are changed. Therefore, when the rotation speeds of the wheels are changed, the relationship between the phase of the phosphor wheel and the phase of the filter wheel may deviate. In this case, the DMD cannot be irradiated with red, green, and yellow high purity lights in a time division manner. Therefore, there is a problem in which the color of the projected image changes.

In DLP (Digital Light Processing) projector, when V-synchronous frequency of the input signal of the image to be projected changes, the refresh rate of the image to be projected by the projector needs to be changed. The refresh rate is the number of times that the screen projected by the projector is rewritten per second. It is necessary to change the irradiation timing of the monochromatic light irradiated to the DMD in accordance with the change of the refresh rate. That is, when the rotational speed of the filter wheel is changed, it is necessary to change the irradiation timing of the monochromatic light that is irradiated to the DMD. In the projector described in Patent Document 1, when the rotational speed of the filter wheel is changed, the rotational speed of the phosphor wheel must be changed in order to maintain the relationship between the phase of the phosphor wheel and the phase of the filter wheel. Therefore, also in this case, when the rotational speed of the phosphor wheel and the rotational speed of the filter wheel are changed, the relationship between the phase of the phosphor wheel and the phase of the filter wheel deviates, and the color of the projected image will be changed.

In view of the above problems, it is an object of the present invention to provide a projector, rotational phase control device, a program for the rotational phase control device, and a wheel rotational speed control method which prevent a change in color in an image to be projected by the projector when the rotational speed of the phosphor wheel is changed.

Means for Solving the Problem

In order to achieve the above object, the first projector of the present invention includes: a phosphor wheel that emits a plurality of different color lights at a cycle corresponding to a rotational speed when excitation light is irradiated; a color wheel into which the lights emitted from the phosphor wheel enter; and a rotational phase control device that controls a rotational speed and a phase of the color wheel in accordance with the rotational speed and phase of the phosphor wheel so that the phase relationship between the phosphor wheel and the color wheel is not changed and so that the ratio of the rotational speed of the phosphor wheel and the rotational speed of the color wheel is equal to the ratio of the rotational speed of the phosphor wheel and the rotational speed of the color wheel in a steady state.

The first rotational phase control device of the present invention includes a rotational phase control unit that, when the rotational speed of a phosphor wheel is changed, controls the rotational speed and the phase of a color wheel in accordance with the rotational speed and phase of the phosphor wheel so that the phase relationship between the phosphor wheel and the color wheel is not changed and so that the ratio of the rotational speed of the phosphor wheel and the rotational speed of the color wheel is equal to the ratio of the rotational speed of the phosphor wheel and the rotational speed of the color wheel in a steady state.

The program of the first rotational phase control device of the present invention causes the rotational phase control device to execute the steps of: detecting the rotational speed and the phase of a phosphor wheel; outputting the rotational speed and phase of a color wheel in accordance with the detected rotational speed and phase so that the phase relationship between the phosphor wheel and the color wheel is not changed and so that the ratio of the rotational speed of the phosphor wheel and the rotational speed of the color wheel is equal to the ratio of the rotational speed of the phosphor wheel and the rotational speed of the color wheel in a steady state; and changing the rotation speed and the phase of the color wheel based on the output rotation speed and phase.

The first wheel rotation speed control method of the present invention includes: emitting, by a phosphor wheel, a plurality of different color lights at a cycle corresponding to a rotational speed when excitation light is irradiated; making light emitted from the phosphor wheel incident on a color wheel; and controlling the rotational speed and phase of the color wheel in accordance with the rotational speed and phase of the phosphor wheel so that the phase relationship between the phosphor wheel and the color wheel is not changed and so that the ratio of the rotational speed of the phosphor wheel and the rotational speed of the color wheel is equal to the ratio of the rotational speed of the phosphor wheel and the rotational speed of the color wheel in a steady state.

Effects of the Invention

According to the present invention, it is possible to prevent a change in color in an image to be projected by the projector when the rotational speed of the phosphor wheel is changed.

BRIEF DESCRIPTION OF THE DRAWINGS

FIG. 1 is a block diagram showing the configuration of a projector according to a first example embodiment of the present invention.

FIG. 2 is a diagram showing the relationship between the physical positions of the phosphor wheel and the color wheel and the color of light irradiated to the display device when the rotational speed of the phosphor wheel is constant in the projector shown in FIG. 1.

FIG. 3 is a block diagram illustrating the configuration of a projector that does not include a rotation phase control unit.

FIG. 4 is a flow chart showing the control flow for changing the rotational speed of the phosphor wheel when the refresh rate changes in the projector shown in FIG. 3.

FIG. 5 is a diagram showing the relationship between the physical positions of the phosphor wheel and the color wheel and the color of the light irradiated to the display device when the refresh rate is changed in the projector shown in FIG. 3.

FIG. 6 is a flow chart showing the control flow for changing the rotational speed of the phosphor wheel when the refresh rate changes in the projector shown in FIG. 1.

FIG. 7 is a flow chart showing e control flow for changing the rotational speed and phase of the color wheel when the rotational speed of the phosphor wheel changes in the projector shown in FIG. 1.

FIG. 8 is a diagram showing the relationship between the physical positions of the phosphor wheel and the color wheel and the color of light irradiated to the display device when the refresh rate is changed in the projector shown in FIG. 1.

FIG. 9 is a block diagram showing the configuration of a projector according to a second example embodiment of the present invention.

FIG. 10 is a block diagram illustrating the configuration of a projector according to a third example embodiment of the present invention, FIG. 11 is a block diagram showing a part including both a phosphor wheel and a color wheel, of a projector according to a fourth example embodiment of the present invention.

FIG. 12 is a block diagram illustrating the configuration of a projector according to a sixth example embodiment of the present invention.

EXAMPLE EMBODIMENTS

Next, example embodiments of the present invention are next described with reference to the accompanying drawings.

First Example Embodiment

FIG. 1 is a block diagram showing the configuration of a projector according to a first example embodiment of the present invention. Referring to FIG. 1, projector 1 includes video signal processing unit 11, excitation light source 12, phosphor wheel 13, color wheel 14, rotational phase control unit 15, display device 16, projection lens 17, motor driver 18, and motor driver 19. Projector 1 is a device for projecting an image.

Video signal processing unit 11 transmits, to motor driver 18, a phosphor wheel control signal which is a signal including information of the changed rotational speed and phase when the rotational speed of phosphor wheel 13 is changed. Video signal processing unit 11 changes the driving frequency of display device 16 in accordance with the rotation speed of phosphor wheel 13.

Excitation light source 12 emits blue excitation tight. A solid-state tight source such as an LED or an LD can be used as excitation light source 12.

Phosphor wheel 13 is disposed at a position where excitation light emitted from excitation light source 12 can enter, and phosphor wheel 13 rotates. When the excitation light is irradiated to phosphor wheel 13, phosphor wheel 13 emits light of a plurality of different colors at a cycle corresponding to the rotation speed. Specifically, phosphor wheel 13 includes a plurality of regions on the substrate that perform different processes on the irradiated excitation light. Phosphor wheel 13 modulates or transmits the irradiated light in accordance with the region irradiated with the excitation light. Then, phosphor wheel 13 emits the processed light.

More specifically, phosphor wheel 13 includes a substrate and phosphor layer 133. The substrate is formed of glass substrate 131 and transparent substrate 132. Glass substrate 131 and transparent substrate 132 integrally form a thin disk-shaped substrate. Glass substrate 131 has a fan shape and is made of transparent glass. When glass substrate 131 is irradiated with blue excitation light, glass substrate 131 transmits the blue excitation light. A portion obtained by removing fan-shaped glass substrate 131 from the disk-shaped substrate as transparent substrate 132. Annular phosphor layer 133 is formed circumferentially on transparent substrate 132. When phosphor layer 133 is irradiated with excitation light, the phosphor included in phosphor layer 133 is excited. The phosphor emits yellow fluorescent light (which includes red, green and yellow lights). That is, in the present embodiment, when phosphor wheel 13 is irradiated with excitation light, phosphor wheel 13 emits blue excitation light and yellow fluorescent light in accordance with the region to which the excitation light is supplied.

Color wheel 14 is disposed at a position where light emitted from phosphor wheel 13 can enter. Color wheel 14 has a thin disk shape. Color wheel 14 is rotatable about a central axis of the disk surface. Color wheel 14 includes transparent glass 141, diffusion plate 142, red filter 143, and green filter 144. Red filter 143 and green filter 144 are examples of color filters. Transparent glass 141, diffusion plate 142, red filter 143, and green filter 144 are arranged in sequence in the circumferential direction. Transparent glass 141 has a characteristic in which incident light is transmitted as is. Diffusing plate 142 has a characteristic in which incident light passes therethrough while keeping the luminance distribution constant. Red filter 143 has a characteristic in which light in a red wavelength region is transmitted and light in a wavelength region other than the red wavelength region is absorbed. Green filter 44 has a characteristic in which light in a green wavelength region is transmitted and light in a wavelength region other than the green wavelength region is absorbed. In the present embodiment, blue excitation light emitted from phosphor wheel 13 enters diffusion plate 142. Yellow fluorescent light emitted from phosphor wheel 13 enters glass 141 green filter 144 and red filter 143. In other words, light emitted from the phosphor wheel enters a corresponding region of color wheel 14.

Rotational phase control unit 15 detects the rotational speed and the phase of phosphor wheel 13 when the rotational speed of phosphor wheel 13 is changed. Further, rotational phase control unit 15 outputs the rotational speed and phase of color wheel 14 in accordance with the detected rotational speed and phase so that the phase relationship between phosphor wheel 13 and color wheel 14 is not changed and so that the ratio of the rotational speed of phosphor wheel 13 and the rotational speed of color wheel 14 is not different from the ratio of the nation speed of phosphor wheel 13 and the rotation speed of color wheel 14 in the steady state. Then, rotational phase control unit 15 transmits, to motor driver 19, a color wheel control signal including information on the output rotational speed and phase of color wheel 14. As a result, rotational phase control unit 15 controls the rotational speed and phase of color wheel 14.

Display device 16 is disposed at a position where light emitted from color wheel 14 can enter. Display device 16 modulates the light emitted by color wheel 14 to generate an image light. A DMD is used as display device 16. The DMD has an imaging surface that is made of a number of micromirrors that are two-dimensionally arranged. The DMD generates image light by modulating incident light in accordance with an input video signal. The image light is emitted from the DMD.

Projection lens 17 is disposed at a position where the image light generated by display device 16 can enter. Projection lens 17 projects the entered image light.

Motor driver 18 receives the phosphor wheel control signal. Motor driver 18 changes the rotational speed and phase of phosphor wheel 13 based on the received phosphor wheel control signal.

Motor driver 19 receives the color wheel control signal. Motor driver 19 changes the rotational speed and phase of color wheel 14 based on the received color wheel control signal.

Next, the operation of projector 1 of the present embodiment will be described in detail.

First, excitation light source 12 emits blue excitation light. The emitted excitation light enters phosphor wheel 13. At this time, phosphor wheel 13 is rotating. Therefore, the excitation light is alternately irradiated to glass substrate 131 and phosphor layer 133. The excitation light that is irradiated to glass substrate 131 passes through glass substrate 131. On the other hand, the excitation light that is irradiated to phosphor layer 133 excites the phosphor of phosphor layer 133. The excited phosphor emits yellow fluorescent light. That is, phosphor wheel 13 alternately emits blue light and yellow light. The period in which phosphor wheel 13 emits light is determined according to the rotational speed of phosphor wheel 13. The color of the emitted light depends on the rotational angle of phosphor wheel 13.

Each color light emitted from phosphor wheel 13 enters color wheel 14. At this time, blue light is irradiated to diffusion plate 142. On the other hand, yellow light is irradiated to glass 141, red filter 143, and green filter 144. That is, color wheel 14 rotates in synchronization with the rotational speed and phase of phosphor wheel 13 so that each color light emitted from phosphor wheel 13 is irradiated to the corresponding area of color wheel 14. In particular, in projector 1 according to the present embodiment, phosphor wheel 13 and color wheel 14 rotate at the same rotational speed and in a state in which the phase relationship is not changed.

Diffusion plate 142 equalizes the luminance distribution of blue light that is irradiated to diffusion plate 142, and diffusion plate 142 transmits the blue light. Glass 141 transmits yellow light irradiated on glass 141 without changing its characteristics. Red filter 143 transmits, from among yellow light that is irradiated to red filter 143, light of the red wavelength component and absorbs light of the other wavelength components. Green filter 144 transmits, from among yellow light that is irradiated to green filter 144, tight of the green wavelength component, and absorbs light of the other wavelength components. Therefore, the light emitted from the phosphor wheel 13 is modulated by color wheel 14 into blue, red, green and yellow lights. These blue, red, green and yellow lights are emitted from color wheel 14 in sequence in a time division manner.

The blue, red, green and yellow lights emitted from color wheel 14 enter display device 16. Display device 16 modulates the blue, red, green and yellow lights to produce blue, red, green and yellow image lights. Display device 16 sequentially emits these image lights. These image lights enter projection lens 17. Projection lens 17 projects the image tights generated by display device 16 on a screen. The projected image lights of blue, red, green, and yellow are continuously projected on the screen, thereby generating one color image.

FIG. 2 is a diagram showing the relationship between the physical positions of phosphor wheel 13 and color wheel 14 and the color of light irradiated to display device 16. When the rotational speed of phosphor wheel 13 is constant.

In FIG. 2, the horizontal axis represents the time axis. The time shown at the upper portion of FIG. 2 indicates the length of one frame. That is, in FIG. 2, the length from the input on the left side (first timing at which the input changes from low level to high level) to the input on the right side (next timing at which the input changes from low level to high level) indicates the time of one frame.

The physical position of the phosphor wheel indicates an irradiation region on phosphor wheel 13 to which light emitted from excitation light source 32 is irradiated at a certain time. On the other hand, the physical position of the color wheel indicates an irradiation region area on color wheel 14 to which light emitted from phosphor wheel 13 is irradiated at a certain time. The light irradiated to the display device indicates the color of light that is irradiated to display device 16 at a certain time.

As can be seen from FIG. 2, when light emitted from excitation light source 32 is irradiated to glass substrate 131 of phosphor wheel 13, light emitted from phosphor wheel 13 is irradiated to diffusion plate 142 of color wheel 14. At this time, the color of light emitted from phosphor wheel 13 is blue, which is the color of blue excitation light that passed through glass substrate 131. The color of light emitted from color wheel 14 is the color of the light that passed through diffusion plate 142. The color of this light is blue, which is the color of blue light emitted by phosphor wheel 13. Thereafter, light emitted from color wheel 14 enters display device 16. Therefore, blue is written in the column of the color of the irradiation light to the display device shown in the figure.

In this manner, from FIG. 2, the color of light irradiated to display device 16 can be read in the steady state until one frame elapses. The steady state means a state in which phosphor wheel 13 rotates at a constant rotation speed without any change in the rotational speed.

<Rotation Speed Control Method of Wheel>

In projector 1 according to the present embodiment, the refresh rate of the image to be projected is changed in accordance with a change in the V synchronization frequency of the video signal of the image to be projected. Accordingly, the driving frequency of display device 16, the rotational speed of color wheel 14, and the rotational speed of phosphor wheel 13 are changed in accordance with the refresh rate. A method of controlling the rotational speed of color wheel 4 at this time will be described in detail.

When the refresh rate changes, video signal processing unit 11 transmits the phosphor wheel control signal to motor driver 18. The phosphor wheel control signal includes information on the rotational speed and phase of phosphor wheel 13 corresponding to the refresh rate. Video signal processing unit 11 changes the driving frequency of display device 86 in accordance with the rotational speed of phosphor wheel 13.

Motor driver 18 receives the phosphor wheel control signal from video signal processing unit 11. After receiving the phosphor control signal, motor driver 18 changes the rotational speed and phase of phosphor wheel 13 to match the phosphor wheel control signal.

Here, phosphor wheel 13 has a moment of inertia. Therefore, when video signal processing unit 11 changes the rotational speed of phosphor wheel 13, it takes some time to change the rotational speed of phosphor wheel 13. During the change time of the rotational speed of phosphor wheel 13, rotational phase control unit 15 detects the rotational speed and phase of phosphor wheel 13. Rotational phase control unit 15 outputs, based on the detected rotational speed and phase, the rotational speed and phase of color wheel 14 so that the phase relationship between phosphor wheel 13 and color wheel 14 is not changed and so that the ratio of the rotational speed of phosphor wheel 13 and the rotational speed of color wheel 14 is not different from the ratio of the rotational speed of phosphor wheel 13 and the rotational speed of color wheel 14 in the steady state. Then, rotational phase control unit 15 transmits, to motor driver 19, the color wheel control signal that includes information on the output rotational speed and phase of color wheel 14.

Rotational phase control unit 15 may detect the change of the rotational speed of phosphor wheel 13 by video signal process 11 based on the signal transmitted from video signal processing unit 11. Rotational phase control unit 15 may detect the change of the rotational speed of phosphor wheel 13 by constantly monitoring its rotational speed.

Motor driver 19 changes the rotational speed and phase of color wheel 14 to match the color wheel control signal. The rotational speed and phase of color wheel 14 are changed by motor driver 19.

Hereinafter, the operation and effect of projector 1 will be described in detail while comparing it with a projector that does not include rotational phase control unit 15. FIG. 3 is a block diagram showing an example of the configuration of projector 3 without rotational phase control unit 15.

Projector 3 includes video signal processing unit 31, excitation light source 32, phosphor wheel 33, color wheel 34, display device 36, projection lens 37, motor driver 38, and motor driver 39. Here, excitation light source 32, phosphor wheel 33, color wheel 34, display device 36, projection lens 37, motor driver 38, and motor driver 39 are the same as the components of projector 1.

First, a problem that occurs when the rotational speed of phosphor wheel 33 is changed in projector 3 without rotational phase control unit 15 will be described.

As shown in FIG. 3, unlike projector 1, projector 3 does not include rotational phase control unit 15. When the rotational speed of phosphor wheel 33 is changed, video signal processing unit 31 changes the rotational speed of color wheel 34 in addition to the processes to phosphor wheel 33 and display device 36.

FIG. 4 is a flow chart showing the control flow for changing the rotational speed of phosphor wheel 33 when the refresh rate is changed in projector 3. A method of controlling the rotational speed of color wheel 34 of projector 3 will be described with reference to FIG. 4.

When the refresh rate of the video signal changes, the drive frequency of display device 36 is changed in step S11. In step S12, phosphor wheel 33 and color wheel 34 are unlocked. This makes it possible to change the rotational speed and phase of both phosphor wheel 33 and color wheel 34. Thereafter, in step S13, the rotational speed of phosphor wheel 33 is changed to a predetermined rotational speed. Apart from phosphor wheel 33, in step S14, the rotational speed of color wheel 34 is changed to a predetermined rotational speed. That is, the rotational speed of phosphor wheel 33 and the rotational speed of color wheel 34 are changed separately. It should be noted that either the processing of step S13 or the processing of step S14 may be performed first. It takes some time to change the rotational speed of phosphor wheel 33 and the rotational speed of color wheel 34. In step S15, the change of the rotational speed of phosphor wheel 33 is completed. In step S16, the change of the rotational speed of color wheel 34 is completed.

Thereafter, in step S17, a phase adjustment control is performed on display device 36, phosphor wheel 33, and color wheel 34, and the phase corresponds to each other. After each phase has been made to correspond to each other, in step S18, phosphor wheel 33 and color wheel 34 are locked. As a result, the phases of display device 36, phosphor wheel 33, and color wheel 34 are synchronized.

FIG. 5 is a diagram showing the relationship between the physical positions of phosphor wheel 33 and color wheel 34 and the color of light irradiated to display device 36 when the refresh rate is changed. When the refresh rate is changed, the time per frame changes as shown in the upper part of FIG. 5. Then, the rotational speed of the phosphor wheel is controlled according to the flow as described above. First, when phosphor wheel 33 and color wheel 34 are unlocked, phosphor wheel 33 and color wheel 34 are out of phase with each other as shown in the drawing. Here, for the purpose of cooling, the size and weight of phosphor wheel 33 are increased. Therefore, the moment of inertia of phosphor wheel 33 is larger than that of color wheel 34. Thus, the response of phosphor wheel 33 is worse than that of color wheel 34 (the responsiveness to the change of the rotational speed). Therefore, when the rotational speed of phosphor wheel 33 and the rotational speed of color wheel 34 are changed, the change of the rotational speed of color wheel 34 is completed first, and then the change of the rotational speed of phosphor wheel 33 is completed, as shown in the drawing. Finally, the phase adjustment control is performed in display device 36, phosphor wheel 33 and color wheel 34 and each phase is locked in a corresponding state.

At this time, the color of light that is irradiated to display device 36 changes as shown in the lower part of the figure. As can be seen from the figure, upon unlocking, upon completion of the color wheel rotational speed change, and upon completion of the phosphor wheel rotational speed change, display device 16 is illuminated in the order of yellow light, blue light, yellow light, red light, and green light. This order differs from the order of yellow light, blue light, red light, and green which is the order of the light originally to be irradiated. Namely, display device 16 is irradiated with yellow after blue light. Thus, the image that is produced by display device 16 is affected by yellow light. Specifically, since yellow light has a relatively high luminance compared to light of other colors, a phenomenon occurs in which an mage that is projected by projector 3 flashes yellow. Thus, there arises a problem in which the color of the image that is projected by projector 3 changes.

On the other hand, FIG. 6 is a flow chart showing the control flow for changing the rotational speed of phosphor wheel 13 when the refresh rate is changed in projector 1 shown in FIG. 1.

When the refresh rate of the video signal changes, in step S31, the drive frequency of display device 16 is changed. In step S32, phosphor wheel 13 is unlocked. In step S33, the rotational speed of phosphor wheel 13 is changed to a predetermined rotational speed. In step S34, the change of the rotational speed of phosphor wheel 13 is completed.

Thereafter, in step S35, phase adjustment control is performed on display device 16 and phosphor wheel 13, and these phases correspond to each other. After the phases have been made to correspond, phosphor wheel 13 is locked in step S36. As a result, the phases of display device 16 and phosphor wheel 13 are synchronized with each other.

At this time, the rotational speed and phase of color wheel 14 are controlled by rotational phase control unit 15. FIG. 7 is a flow chart showing the control flow for changing the rotational speed and phase of color wheel 14 when the rotational speed of phosphor wheel 13 changes in projector 1 shown in FIG. 1.

When the rotational speed of phosphor wheel 13 changes, in step S51, rotational phase control unit 15 detects the rotational speed and phase of phosphor wheel 13. In step S52, rotational phase control unit 15 outputs the rotational speed and phase of color wheel 14 according to the detected rotational speed and phase of phosphor wheel 13. In step S53, rotational phase control unit 15 changes the rotational speed and phase of color wheel 14 based on the output rotational speed and phase of color wheel 14.

In step S54, the changes of the rotational speed and phase of color wheel 14 are completed.

FIG. 8 is a diagram showing the relationship between the physical positions of phosphor wheel 13 and color wheel 14 and the color of light irradiated to display device 16 when the refresh rate is changed in projector 1 shown in FIG. 1. As described above, rotational phase controller 15 controls color wheel 14. Since phosphor wheel 13 is larger than color wheel 14 as described above, the moment of inertia of color wheel 14 is smaller than that of phosphor wheel 13. Therefore, the responsiveness of the change in the rotational speed of the color wheel 14 is superior to that of the phosphor wheel 13. As a result, even when the rotational speed of phosphor wheel 13 is changed, the rotational speed and phase of phosphor wheel 13 and the rotational speed and phase of color wheel 14 are barely out of synchronism with each other.

Therefore, as can be seen from FIG. 8, unlike projector 3 shown in FIG. 3, when the rotational speed of phosphor wheel 13 is changed, it is difficult for deviation to occur in the relationship between the physical position of the phosphor wheel and the physical position of the color wheel. That is, the order of light that is emitted to display device 16 is not changed. Thus, unlike projector 3, projector 1 according to the present embodiment can prevent the occurrence of a phenomenon in which an image to be projected makes a flash in yellow. That is, a change in the color of the projected image in projector 1 is prevented.

In projector 3, video signal processing unit 31 needs to adjust the phases of three devices, i.e., display device 36, phosphor wheel 33, and color wheel 34 to lock them. On the other hand, in projector 1 according to the present embodiment, video signal processing unit 11 can shorten the time required for phase adjustment in order to control the two devices, i.e., display device 16 and phosphor wheel 13.

<Modifications>

In projector 1 of the present embodiment, phosphor wheel 13 emits two color lights, i.e., blue light and yellow light. However, the phosphor wheel may emit lights of three or more different colors. In this case as well, the projector controls the rotational speed of the phosphor wheel in the same manner as in the present embodiment, so that when the rotational speed of the phosphor wheel is changed, light that is emitted from the phosphor wheel enters the corresponding region of the color wheel. As a result, the projector that is provided with the phosphor wheel that emits light of a plurality of different colors can provide the same operation and effect as projector 1.

In projector 1 of the present embodiment, the rotational speed of phosphor wheel 13 and rotational speed of color wheel 14 in the steady state may be the same.

In the present embodiment, rotational phase control unit 15 controls color wheel 14 in accordance with the rotational speed and phase of phosphor wheel 13 that is heavier than color wheel 14. However, when color wheel 14 is heavier than phosphor wheel 13, rotational phase control unit 15 may control phosphor wheel 13 according to the rotational speed and phase of color wheel 14. That is, rotational phase control unit 15 may control the light-weight wheel, which is the lighter wheel from among phosphor wheel 13 and color wheel 14, according to the rotational speed and phase of the weighted wheel, which is the heavier wheel from among phosphor wheel 13 and color wheel 14.

Second Example Embodiment

FIG. 9 is a block diagram showing the configuration of a projector according to a second example embodiment of the present invention. Referring to FIG. 9, projector 5 includes video signal processing unit 51, phosphor wheel 53, color wheel 54, rotational phase control unit 55, display device 56, and motor driver 58. Here, video signal processing unit 51, phosphor wheel 53, color wheel 54, display device 56, and motor driver 58 are the same as those described in the first example embodiment.

Rotational phase control unit 55 is composed of a mechanical element. Specifically, rotational phase control unit 55 includes a plurality of gears. Rotational phase control unit 55 connects phosphor wheel 53 and color wheel 54. The gears of rotational phase control unit 55 are arranged to rotate color wheel 54 in the state in which the phase relationship between phosphor wheel 53 and color wheel 54 is not changed when phosphor wheel 53 rotates and in which the ratio of the rotational speed of phosphor wheel 53 and the rotational speed of color wheel 54 is not different from the ratio of the rotational speed of phosphor wheel 53 and the rotational speed of color wheel 54 in the steady state.

In the present embodiment, phosphor wheel 53 and color wheel 54 are connected to each other by rotational phase control unit 55 that is composed of a mechanical element. Therefore, color wheel 54 rotates in conjunction with the rotation of phosphor wheel 53. Also in projector 5 according to the present embodiment, the same operation and effect as those of projector 1 according to the first example embodiment described above can be obtained.

In the present embodiment, phosphor wheel 53 and color wheel 54 are coupled by the gears. However, phosphor wheel 53 and color wheel 54 may be connected by various mechanical elements such as a chain, a belt, and a pulley.

Third Example Embodiment

FIG. 10 is a block diagram showing configuration of a projector according to a third example embodiment of the present invention. Retiring to FIG. 10, projector 7 includes video signal processing unit 71, excitation light source 720, excitation light source 721, phosphor wheel 730, phosphor wheel 731, color wheel 74, rotational phase control unit 75, display device 76, and projection lens 77. Here, video signal processing unit 71, excitation light source 720, excitation light source 721, phosphor wheel 730, phosphor wheel 731, color wheel 74, display device 76, and projection lens 77 are the same as those described in the first example embodiment. Projector 7 has a configuration in which excitation light source 720 and another excitation light source 721 and phosphor wheel 730 and another phosphor wheel 731 are added to projector 3 in order to obtain a larger amount of light. Excitation light source 721 has the same configuration as excitation light source 720. Phosphor wheel 731 has the same configuration as phosphor wheel 731.

In the present embodiment, light emitted from each of phosphor wheel 730 and phosphor wheel 731 is collectively incident on color wheel 74. Therefore, it is necessary to simultaneously emit light of the same color from phosphor wheel 730 and phosphor wheel 731.

Rotational phase control unit 75 controls the rotational speed and phase of another phosphor wheel 731 so that the phase relationship between phosphor wheel 730 and another phosphor wheel 731 is not changed and so that the ratio between phosphor wheel 730 and another phosphor wheel 731 is not different from the ratio between phosphor wheel 730 and another phosphor wheel 731 in the steady state.

Thus, the color of the light emitted from each of phosphor wheel 730 and phosphor wheel 731 be simultaneously set to the same color. Therefore, even when a plurality of phosphor wheels are used, the same operation and effect as those of projector 1 described in the first example embodiment can be obtained.

Three or more phosphor wheels may be used. In this case, one phosphor wheel is set as the master wheel. Rotational phase control unit 105 controls the rotational speed and phase of the other color wheel so that the phase relationship between the master wheel and the other phosphor wheel is not changed and so that the ratio of the rotational speed of the master wheel and the other phosphor wheel is not different from the ratio of the rotational speed of the master wheel and the other phosphor wheel in the steady state.

Fourth Example Embodiment

The projector according to a fourth example embodiment of the present invention has the same configuration as projector 1 according to the first example embodiment except that the phosphor wheel and the color wheel are different from those of projector 1.

FIG. 11 is a block diagram showing the configuration of the portion including a phosphor wheel and a color wheel in a projector according to the fourth example embodiment of the present invention. As shown in FIG. 11, projector 8 includes phosphor wheel 83 and color wheel 84.

Phosphor wheel 83 includes glass substrate 131 and phosphor layer 833. Glass substrate 831 and phosphor layer 833 have the same structures as those described in the first example embodiment.

Color wheel 84 includes transparent glass 841, diffusion plate 842, red filter 843, and green filter 844. Transparent glass 841, diffusion plate 842, red filter 843, and green filter 844 have the same configurations as those described in the first example embodiment.

Projector 8 differs from projector 1 in that color wheel 84 rotates twice while phosphor wheel 83 rotates once. On color wheel 84, regions that are formed of different materials and that include transparent glass 841, diffusion plate 842, green filter 844, red filter 843, transparent glass 841, diffusion plate 842, green filter 844, and red filter 843, are arranged in order. Therefore, even when the rotational speed of phosphor wheel 83 is different from the rotational speed of color wheel 84, blue light emitted from the phosphor wheel 83 is irradiated to diffusion plate 842 of color wheel 84. Similarly, yellow light emitted from phosphor wheel 83 is irradiated to transparent glass 841, green filter 844, and red filter 843.

Even when the rotational speed of phosphor wheel 83 is different from the rotational speed of color wheel 84, the rotational phase control unit (not shown) acquires the rotational speed and phase of phosphor wheel 83 when the rotational speed of phosphor wheel 83 is changed. The rotation phase control unit controls the rotational speed and phase of color wheel 84 according to the obtained rotation speed and phase so that the phase relationship between phosphor wheel 83 and color wheel 84 is not changed and so that the ratio of the rotational speed of phosphor wheel 83 and the rotational speed of color wheel 84 is not different from the ratio of the rotational speed of phosphor wheel 83 and the rotational speed of color wheel 84 in the steady state.

As a result, projector 8 of the present embodiment also exhibits the same operation and effect as those of projector 1 described in the first example embodiment.

<Modifications>

The ratio of the rotational speed of the phosphor wheel 83 and the rotational speed of color wheel 84 in the present embodiment is 2 to 1. However, the ratio of the rotational speed of phosphor wheel 83 and the rotational speed of color wheel 84 is not limited to this ratio. The rotational speed ratio may be 1:2 or 3:1.

Sixth Example Embodiment

FIG. 12 is a block diagram showing the configuration of a projector according to a sixth example embodiment of the present invention. Referring to FIG. 1, projector 9 includes phosphor wheel 93, color wheel 94, and rotational phase control device 95. Rotational phase control device 95 may include a rotation phase control unit and a motor driver.

When excitation light is irradiated to phosphor wheel 93, phosphor wheel 93 emits a plurality of different color lights at a cycle corresponding to the rotational speed.

Light emitted from phosphor wheel 93 enters color wheel 94.

Rotational phase control device 95 controls the rotation speed and phase of color wheel 94 according to the rotational speed and phase of phosphor wheel 93 so that the phase relationship between phosphor wheel 93 and color wheel 94 is not changed and so that the ratio of the rotational speed of phosphor wheel 93 and the rotational speed of color wheel 94 is equal to the ratio of the rotational speed of phosphor wheel 93 and the rotational speed of color wheel 94 in the steady state.

Hereinafter, the operation and effect of the present embodiment will be described.

In projector 9 according to the present embodiment, rotational phase control device 95 controls the rotational speed and phase of color wheel 94 according to the rotational speed and phase of phosphor wheel 93 so that the phase relationship between phosphor wheel 93 and color wheel 94 is not changed and so that the ratio of rotational speed of phosphor wheel 93 and the rotational speed of color wheel 94 is equal to the ratio of the rotational speed of phosphor wheel 93 and the rotational speed of color wheel 94 in the steady state.

Therefore, when the rotational speed of phosphor wheel 93 is changed, the rotational speed and phase of phosphor wheel 93 and the rotational speed and phase of color wheel 94 are not synchronized with each other. That is, the color of light generated by phosphor wheel 93 and color wheel 94 by using excitation light is not changed.

Thus, in projector 9, it is possible to prevent a change in the color of the image projected by projector 9 when the rotational speed of the wheel is changed.

EXPLANATION OF REFERENCE NUMBERS

9 Projector
91 Video signal processing unit
93 Phosphor wheel
94 Color wheel
95 Rotational phase control device

The invention claimed is:

1. A projector comprising:
   a phosphor wheel that emits a plurality of different color lights at a cycle corresponding to a rotational speed when excitation light is irradiated;
   a color wheel into which the lights emitted from said phosphor wheel enter; and
   a rotational phase control device that controls a rotational speed and a phase of said color wheel in accordance with a rotational speed and a phase of said phosphor wheel, wherein said rotational phase control device comprises a rotational phase control unit that, when the rotational speed of said phosphor wheel is changed, controls the rotational speed and the phase of said color wheel in accordance with the rotational speed and the phase of said phosphor wheel so that a phase relationship between said phosphor wheel and said color wheel is not changed and so that a ratio of the rotational speed of said phosphor wheel and the rotational speed of said color wheel is equal to a ratio of the rotational speed of said phosphor wheel and the rotational speed of said color wheel in a steady state in which said phosphor wheel rotates at a constant rotation speed without any change in its rotation speed.

2. The projector according to claim 1, wherein said rotational phase control device comprises a mechanical element that connects said phosphor wheel and said color wheel.

3. The projector according to claim 1, wherein the rotational speed of said phosphor wheel is equal to the rotational speed of said color wheel in the steady state.

4. The projector according to claim 1, further comprising a plurality of said phosphor wheels, wherein said rotational phase control device further controls said plurality of phosphor wheels so as not to change the phase relationship with each other and so that the ratio of the rotational speeds is not different from the ratio of the rotational speeds with respect to each other in the steady state.

5. A projector comprising:
a phosphor wheel that emits a plurality of different color lights at a cycle corresponding to a rotational speed when excitation light is irradiated;
a color wheel into which the lights emitted from said phosphor wheel enter; and a rotational phase control device that controls a rotational speed and a phase of said color wheel in accordance with a rotational speed and a phase of said phosphor wheel so that a phase relationship between said phosphor wheel and said color wheel is not changed and so that a ratio of the rotational speed of said phosphor wheel and the rotational speed of said color wheel is equal to a ratio of the rotational speed of said phosphor wheel and the rotational speed of said color wheel in a steady state in which said phosphor wheel rotates at a constant rotation speed without any change in its rotation speed, wherein said rotational phase control device comprises:
a rotational phase control unit that detects the rotational speed and the phase of said phosphor wheel when the rotational speed of said phosphor wheel is changed and that transmits, as a color wheel control signal, a signal that corresponds to the rotational speed and the phase of said color wheel, in which the phase relationship between said phosphor wheel and said color wheel is not changed and in which the ratio of the rotational speed of said phosphor wheel and the rotational speed of said color wheel is equal to the ratio of the rotational speed of said phosphor wheel and the rotational speed of said color wheel in the steady state, based on the detected rotational speed and phase; and
a motor driver that receives the color wheel control signal and that changes the rotational speed and the phase of said color wheel based on the color wheel control signal.

6. A rotational phase control device comprising a rotational phase control unit that, when a rotational speed of a phosphor wheel is changed, controls a rotational speed and a phase of a color wheel in accordance with the rotational speed and a phase of said phosphor wheel so that a phase relationship between said phosphor wheel and said color wheel is not changed and so that a ratio of the rotational speed of said phosphor wheel and the rotational speed of said color wheel is equal to a ratio of the rotational speed of said phosphor wheel and the rotational speed of said color wheel in a steady state in which said phosphor wheel rotates at a constant rotation speed without any change in its rotation speed.

7. A method of controlling a rotational speed of a wheel, said method comprising:
emitting, by a phosphor wheel, a plurality of different color lights at a cycle corresponding to a rotational speed when excitation light is irradiated;
making light emitted from said phosphor wheel incident on a color wheel; and
controlling, by a rotational phase control unit, when a rotational speed of phosphor wheel is changed, a rotational speed and a phase of said color wheel in accordance with a rotational speed and a phase of said phosphor wheel so that a phase relationship between said phosphor wheel and said color wheel is not changed and so that a ratio of the rotational speed of said phosphor wheel and the rotational speed of said color wheel is equal to a ratio of the rotational speed of said phosphor wheel and the rotational speed of said color wheel in a steady state in which said phosphor wheel rotates at a constant rotation speed without any change in its rotation speed.

8. The method of controlling a rotational speed of a wheel according to claim 7, further comprising:
receiving, by a motor driver, a color wheel control signal; and
changing, by the motor driver, the rotational speed and the phase of said color wheel based on the color wheel control signal.

9. A projector comprising;
a first wheel that includes a phosphor that emits a plurality of different color lights at a cycle corresponding to a rotational speed when excitation light is irradiated;
a second wheel that includes a color filter into which the lights emitted from said first wheel enter; and
a rotation phase control device that controls a rotational speed and a phase of a lighter wheel of said first wheel and said second wheel in accordance with a rotational speed and a phase of a heavier wheel of said first wheel and said second wheel so that a phase relationship between said first wheel and said second wheel is not changed and so that the rotational speed of said first wheel is equal to the rotational speed of said second wheel, wherein, of said first wheel and said second wheel, a wheel whose weight is heavier of said first wheel and said second wheel is set as a heavy-weight wheel and a wheel whose weight is lighter of said first wheel and said second wheel is set as a light-weight wheel.

10. A projector comprising;
a phosphor wheel that emits a plurality of different color lights at a cycle corresponding to a rotational speed when excitation light is irradiated;
a color wheel into which the lights emitted from said phosphor wheel enter; and
a rotational phase control device that controls a rotational speed and a phase of a light-weight wheel, which comprises a lighter wheel from among said phosphor wheel and said color wheel, according to a rotational speed and a phase of a weighted wheel, which comprises a heavier wheel from among said phosphor wheel and said color wheel.

11. The projector according to claim 10, wherein, when the rotational speed of said light-weight wheel is changed, said rotational phase control device further controls the rotational speed and the phase of said weighted wheel in accordance with the rotational speed and the phase of said light-weight wheel so that the phase relationship between said light-weight wheel and said weighted wheel is not changed and so that the ratio of the rotational speed of said light-weight wheel and the rotational speed of said weighted wheel is equal to the ratio of the rotational speed of said light-weight wheel and the rotational speed of said weighted wheel in a steady state in which said light-weight wheel rotates at a constant rotation speed without any change in its rotation speed.

12. The projector according to claim 10, wherein, when the rotational speed of said light-weight wheel is changed, said rotational phase control device further controls the rotational speed of said weighted wheel in accordance with the rotational speed and the phase of said light-weight wheel so that said light-weight wheel and said weighted wheel maintain the same rotational speed as each other.

13. The projector according to claim 10, wherein the rotational speed of said light-weight wheel is equal to the rotational speed of said weighted wheel in a steady state in which said light-weight wheel rotates at a constant rotation speed without any change in its rotation speed.

14. The projector according to claim 10, wherein said rotational phase control device comprises:

a rotational phase control unit that detects the rotational speed and the phase of said light-weight wheel when the rotational speed of said light-weight wheel is changed and that transmits, as a weighted wheel control signal, a signal that corresponds to the rotational speed and the phase of said weighted wheel, in which the phase relationship between said light-weight wheel and said weighted wheel is not changed and in which the ratio of the rotational speed of said light-weight wheel and the rotational speed of said weighted wheel is equal to the ratio of the rotational speed of said light-weight wheel and the rotational speed of said weighted wheel in a steady state in which said light-weight wheel rotates at a constant rotation speed without any change in its rotation speed, based on the detected rotational speed and phase.

15. The projector according to claim 10, wherein said rotational phase control device comprises:

a motor driver that receives a weighted wheel control signal and that changes the rotational speed and the phase of said weighted wheel based on the weighted wheel control signal.

16. A method of controlling a rotational speed of a wheel, said method comprising:

emitting, by a phosphor wheel, a plurality of different color lights at a cycle corresponding to a rotational speed when excitation light is irradiated;

making light emitted from said phosphor wheel incident on a color wheel; and controlling a rotational speed and a phase of said color wheel in accordance with a rotational speed and a phase of said phosphor wheel so that a phase relationship between said phosphor wheel and said color wheel is not changed and so that a ratio of the rotational speed of said phosphor wheel and the rotational speed of said color wheel is equal to a ratio of the rotational speed of said phosphor wheel and the rotational speed of said color wheel in a steady state in which said phosphor wheel rotates at a constant rotation sped without any change in its rotation;

detecting, by a rotational phase control unit, the rotational speed and the phase of said phosphor wheel when the rotational speed of said phosphor wheel is changed; and transmitting, as a color wheel control signal, a signal that corresponds to the rotational speed and the phase of said color wheel, in which the phase relationship between said phosphor wheel and said color wheel is not changed and in which the ratio of the rotational speed of said phosphor wheel and the rotational speed of said color wheel is equal to the ratio of the rotational speed of said phosphor wheel and the rotational speed of said color wheel in the steady state, based on the detected rotational speed and phase.

* * * * *